(12) United States Patent
Blankson

(10) Patent No.: US 9,333,836 B2
(45) Date of Patent: May 10, 2016

(54) KOO TAYLOR AUTOMOBILE SIDE VISOR

(71) Applicant: Charles Codman Blankson, Fontana, CA (US)

(72) Inventor: Charles Codman Blankson, Fontana, CA (US)

( * ) Notice: Subject to any disclaimer, the term of this patent is extended or adjusted under 35 U.S.C. 154(b) by 0 days.

(21) Appl. No.: 14/147,329

(22) Filed: Jan. 27, 2014

(65) Prior Publication Data

US 2015/0210145 A1  Jul. 30, 2015

(51) Int. Cl.
*B60J 3/02* (2006.01)

(52) U.S. Cl.
CPC .................................. *B60J 3/0208* (2013.01)

(58) Field of Classification Search
CPC ..................................................... B60J 3/0208
USPC .................... 296/96.2, 97.8, 97.12, 97.13
See application file for complete search history.

(56) References Cited

U.S. PATENT DOCUMENTS

| | | | | |
|---|---|---|---|---|
| 4,580,829 A * | 4/1986 | Matheopoulos | ............ | 296/97.6 |
| 5,626,381 A * | 5/1997 | Gervasoni et al. | ........... | 296/97.8 |
| 5,673,957 A * | 10/1997 | Moo et al. | .................... | 296/97.6 |
| 6,290,280 B1 * | 9/2001 | Riekse | ......................... | 296/97.6 |
| 6,981,733 B1 * | 1/2006 | Driscoll | ....................... | 296/97.6 |
| 7,121,672 B1 * | 10/2006 | Swain | ............................ | 359/601 |
| 7,188,886 B2 * | 3/2007 | Lee | ................................ | 296/97.8 |
| 7,216,918 B1 * | 5/2007 | Runfola | ................ | B60J 3/0204 296/97.11 |
| 8,042,867 B2 * | 10/2011 | Meister | ............... | B64D 11/064 297/216.15 |
| 8,100,459 B2 * | 1/2012 | Glaser | ................... | B60J 7/0015 160/370.22 |
| 8,714,621 B2 * | 5/2014 | Marcus et al. | ............. | 296/97.11 |
| 2009/0045647 A1 * | 2/2009 | Whitlock | ..................... | 296/97.9 |
| 2013/0001977 A1 * | 1/2013 | Marcus | ........................ | 296/97.6 |

* cited by examiner

*Primary Examiner* — Pinel Romain

(57) ABSTRACT

This automobile device is a Rectangular Box, hereafter referred to as the Box. The Box is designed to protect the automobile vehicle driver and the front seat passenger from the sun's glare and heat when the sun is on either side of the vehicle. The device blocks the glare and heat from penetrating the sides of the vehicle. The Box has four inside panels. The Box also has an opening on one of the elongated sides. These panels are extended from the Box through the opening to provide protection from the sun's glare and heat. Two of the panels are pulled out towards the front of the vehicle. The remaining two panels are enclosed in the first two panels and may be pulled down. The Box has a back portion that has a mount which is attached inside the automobile. It is attached to the middle pillar, also known as Door Pillar, between the two side doors, just above the seat belt buckle. The Box comes in two configurations. The first configuration is for the Driver side. The second configuration is for the front seat Passenger side.

12 Claims, 4 Drawing Sheets

The Driver Side Visor

The Visor: a 3" x 5" x 0.5" Device

The Standard Model with one of the inside panels (P1) pulled out towards the front of the vehicle.   1

The Driver Side Visor
Fig. 1A  The Visor: a 3" x 5" x 0.5" Device
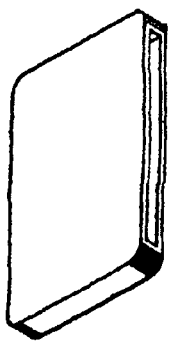
Fig. 1B  The Standard Model with one of the inside panels (P1) pulled out towards the front of the vehicle.
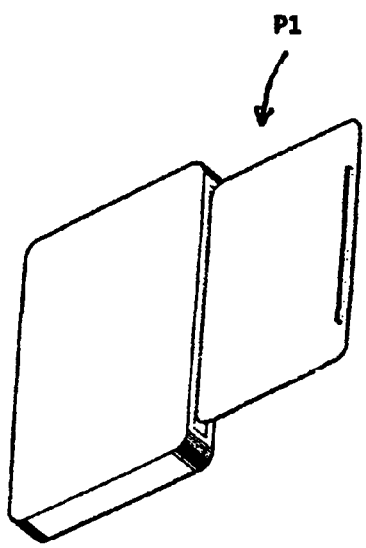

The Driver Side Cont'd.
Fig. 1C   The Duplex Model with two of the inside panels (P1 & P2) pulled out towards the front of the vehicle.
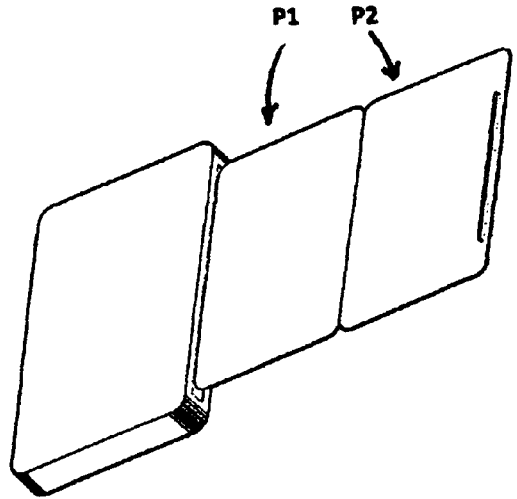
Fig. 1D   The Fourplex Model with all the four panels (P1, P2, P3 & P4) fully extended including the two dropdowns.
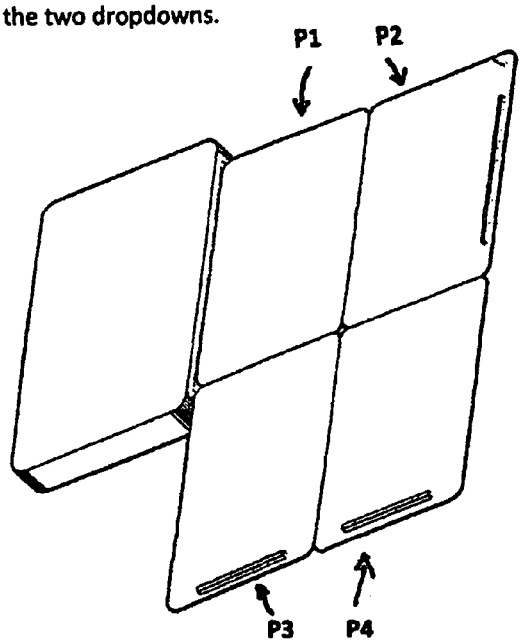

The Passenger Side Visor
Fig. 2A  The Visor: a 3" x 5" x 0.5" Device
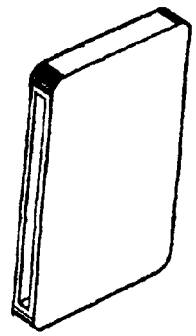
Fig. 2B  The Standard Model with one of the inside panels (S1) pulled out towards the front of the vehicle.
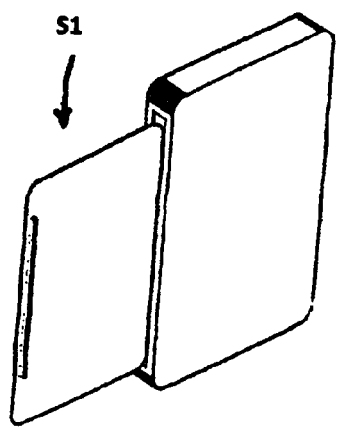

The Passenger Side Cont'd
Fig. 2C    The Duplex Model with two of the inside panels (S1 & S2) pulled out towards the front of the vehicle.
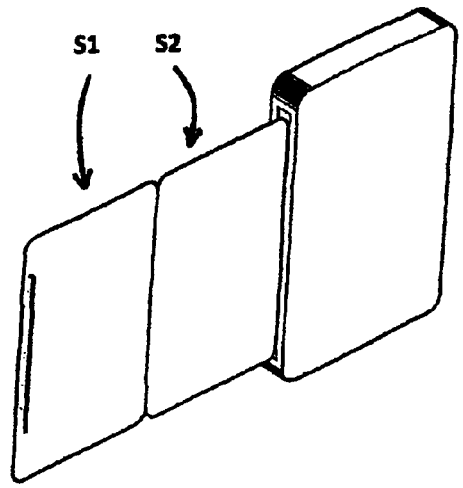
Fig. 2D    The Fourplex Model with all the four panels (S1, S2, S3 & S4) fully extended including the two dropdowns.
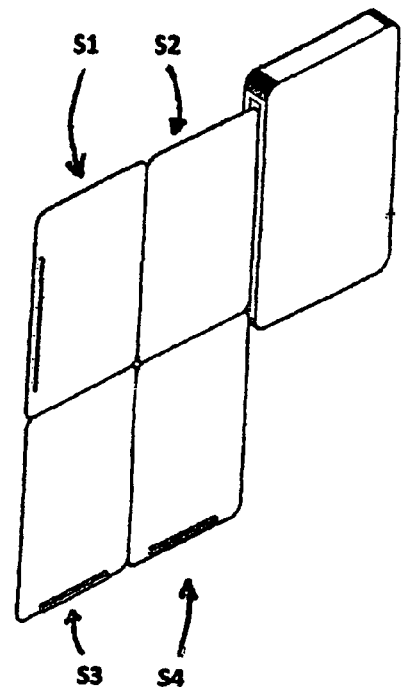

KOO TAYLOR AUTOMOBILE SIDE VISOR

BACKGROUND OF THE INVENTION

The current sun visors in automobiles work well to shade and protect the driver as well as the front seat passenger from the sun's glare and heat when the vehicle is being driven in the direction of the sun. However, the visors don't offer complete protection to the driver or the front seat passenger when the sun's glare and heat are coming from either side of the vehicle through the side windows. Although the two current front visors commonly found in automobile vehicles today can be rotated downwards or sideways to cover part of the side windows, and many of these front visors have panels that can be pulled out towards the back of the vehicle to provide more protection, the extended visors do not cover the entire upper part of the side windows.

The proposed device is unique. It is unique because unlike the innovations to the automobile visor currently on the market, and those referenced below*, along with those incorporated by the referenced inventions, this proposed visor is not mounted or attached to the existing front visor or to the windshield, or to the side window, or between the side window and the window weather stripping. It is also not attached to the front roof or the pillar holding the windshield.

This proposed device is mounted on the inside of the vehicle, on the middle pillar between the two side doors, just above the seat belt buckle.

The proposed device comes in two configurations. The first configuration is mounted on the driver side of the vehicle. The second configuration is mounted on the front passenger side.

*REFERENCES

Driscoll, Valerie: U.S. Pat. No. 6,981,733
Gervasoni, Pascal: U.S. Pat. No. 5,626,381
Matheopoulos, Paul: U.S. Pat. No. 4,580,829
Lee, Jae Woo: U.S. Pat. No. 7,188,886

DESCRIPTION OF THE DRAWINGS

The proposed automobile visor is presented in the following diagrams:

FIG. 1A shows the Driver Side Visor with Box X on Pillar M.

FIG. 1B shows the Standard Model as noted in claim 5, with one panel, P1, pulled out from Box X towards the front of the vehicle.

FIG. 1C shows the Duplex Model as noted in claim 6, with two panels, P1 and P2 pulled out from Box X towards the front of the vehicle.

FIG. 1D shows the Fourplex Model as noted in claim 7, with all the four panels, P1, P2, P3 and P4 fully extended from Box X.

FIG. 2A shows the Passenger Side Visor with Box Y on Pillar N.

FIG. 2B shows the Standard Model as noted in claim 11, with one panel, S1, pulled out from Box Y towards the front of the vehicle.

FIG. 2C shows the Duplex Model as noted in claim 12, with two panels, S1 and S2 pulled out from Box Y towards the front of the vehicle.

FIG. 2D shows the Fourplex Model as noted in claim 13, with four panels, S1, S2, S3 and S4 full extended from Box Y.

I claim:

1. An automobile sun shield packet consists of a driver side visor and a passenger side visor;
   driver side visor consists of a driver side rectangular box, X;
   the passenger side visor consist of passenger side rectangular, box, Y;
   the driver side visor has an opening of a right elongated side of the driver side rectangular box;
   a mount on a back to affix said driver side box to a door pillar between two side doors and above a seat belt buckle.

2. The sun shield packet of claim 1 said driver side box X contains up to four inside panels;
   said driver side box consist of driver side box first panel, P1;
   driver side box second panel, P2;
   driver side box third panel, P3;
   driver side box fourth panel, P4;
   P1 is larger than P2;
   P2 is larger than P3;
   P3 is larger than P4 and
   Wherein, P1 as the largest and P4 as the smallest.

3. The automobile sun shield packet of claim 1, said driver side visor consists of three different models: a standard model, a duplex model and a fourplex model.

4. The automobile sun shield packet of claim 3 consist the duplex model has two inside panels,
   duplex model inside panel, P1;
   duplex model inside panel P2;
   P2 is embedded in P1 and
   P2 pulls out from P1 towards the front of the vehicle.

5. The automotive sun shield packet of claim 3, the fourplex model has four inside panels;
   fourplex model inside panel P1;
   fourplex model inside panel P2;
   fourplex model inside panel P3;
   fourplex model inside panel P4; and
   P3 and P4 pull downward from P1 and P2 respectively.

6. The automobile sun shield packet of claim 2, the standard model has one inside panel, P1;
   P1 pulled out towards the front of the vehicle through an opening on the right side of Box X.

7. The automotive sun shield packet of claim 1, said passenger side visor box Y consist of;
   the passenger side visor box Y has an opening on a left elongated side;
   the passenger side visor box Y contains up to four inside panels;
   the passenger side visor box Y has a mount on a back portion to affix said side visor box Y to the door pillar between two side doors and above the seat belt buckle, inside the vehicle.

8. The automotive sun shield packet of claim 7, said passenger visor consist of the four inside panels in box Y;
   the passenger side visor box first panel, S1;
   the passenger side visor box second panel, S2;
   the passenger side visor box third panel, S3;
   the passenger side visor box third panel S4 and
   S1 is larger than S2 and S2 is larger than S3, and S3 is larger than S4.

9. The automotive sun shield packet of claim 7, the passenger side visor box Y comes in three different models;
   a passenger side visor box standard model;
   a passenger side visor box duplex model;
   and the passenger side visor box fourplex model.

10. The automotive sun shield packet of claim 9, the passenger side visor consist of the duplex model to include two inside panels;
    passenger side duplex first inside panel, S1;

passenger side duplex second inside panel, S2;
the duplex first inside panel S2 is embedded in the duplex second inside panel S1;
and the panel S2 pulled out from panel S1 towards the front of the vehicle.

11. The automotive sun shield packet of claim 9, the passenger side visor consist of the fourplex model which include four inside panels;
passenger side duplex inside first panel, S1;
passenger side duplex inside second panel, S2,
passenger side duplex inside third panel, S3;
passenger side duplex inside third panel, S4 and
S3 and S4 is pull down from S1 and S2 respectively.

12. The automotive sun shield packet of claim 8, consist of the passenger side visor box Standard Model to include one inside panel, S1, the inside panel S1 pulled out towards the front of the vehicle through the opening on the left side of Box Y.

* * * * *